(12) United States Patent
Duerig et al.

(10) Patent No.: US 8,903,182 B1
(45) Date of Patent: Dec. 2, 2014

(54) IMAGE CLASSIFICATION

(71) Applicant: Google Inc., Mountain View, CA (US)

(72) Inventors: Thomas J. Duerig, Sunnyvale, CA (US); Charles J. Rosenberg, Cupertino, CA (US); Kunlong Gu, Belmont, CA (US); Samy Bengio, Los Altos, CA (US)

(73) Assignee: Google Inc., Mountain View, CA (US)

( * ) Notice: Subject to any disclaimer, the term of this patent is extended or adjusted under 35 U.S.C. 154(b) by 210 days.

(21) Appl. No.: 13/666,083

(22) Filed: Nov. 1, 2012

Related U.S. Application Data

(60) Provisional application No. 61/608,548, filed on Mar. 8, 2012.

(51) Int. Cl.
*G06K 9/62* (2006.01)
*G06K 9/46* (2006.01)
*G06K 9/54* (2006.01)

(52) U.S. Cl.
USPC ............ 382/224; 382/159; 382/190; 382/305

(58) Field of Classification Search
CPC . G06K 9/6212; G06K 9/6227; G06K 9/6256; G06T 2207/20081
USPC .................................. 382/159, 224, 190, 305
See application file for complete search history.

(56) References Cited

U.S. PATENT DOCUMENTS

| | | | | |
|---|---|---|---|---|
| 7,949,181 B2 * | 5/2011 | Padfield et al. | ............... | 382/164 |
| 8,452,088 B1 * | 5/2013 | De Ponti et al. | .............. | 382/165 |
| 8,712,157 B2 * | 4/2014 | Marchesotti et al. | ......... | 382/190 |
| 8,775,424 B2 * | 7/2014 | Skaff et al. | .................... | 707/737 |
| 2013/0151441 A1 * | 6/2013 | Archambeau et al. | .......... | 706/12 |

OTHER PUBLICATIONS

Krapac, J.; Allan, M.; Verbeek, J.; Jurie, F., "Improving web image search results using query-relative classifiers," Computer Vision and Pattern Recognition (CVPR), 2010 IEEE Conference on , vol., no., pp. 1094,1101, Jun. 13-18, 2010.*

Barla et al., "Histogram Intersection Kernel for Image Classification" International Conference on Image Processing—ICIP , vol. 3, pp. 513-516, 2003.

Grangier et al., "A Discriminative Kernel-Based Model to Rank Images from Text Queries" IEEE Transactions on Pattern Analysis and Machine Intelligence, vol. 30, No. 8, pp. 1371-1384, Aug. 2008.

Boughorbel et al., "Generalized Histogram Intersection Kernel for Image Recognition", ICIP vol. 3, pp. 161-164, 2005.

* cited by examiner

*Primary Examiner* — Utpal Shah
(74) *Attorney, Agent, or Firm* — Fish & Richardson P.C.

(57) ABSTRACT

Methods, systems, and apparatus, including computer programs encoded on a computer storage medium, for classifying images. In one aspect, a method includes receiving training samples for a particular data dimension. Each training sample specifies a training value for the data dimension and a measure of relevance between the training sample and a phrase. A value range is determined for the data dimension. The value range is segmented into two or more segments. A predictive model is trained for each segment. The predictive model for each segment is trained to predict an output based on an input value that is within the segment. A classification sample specifying an input value is received. A classification output is computed based on the input value, the predictive model for the segment in which the input value is included, and the predictive model for an adjacent segment.

20 Claims, 9 Drawing Sheets

IMAGE CLASSIFICATION

CROSS-REFERENCE TO RELATED APPLICATIONS

This application claims the benefit under 35 U.S.C. §119(e) of U.S. Patent Application No. 61/608,548, entitled "IMAGE CLASSIFICATION," filed Mar. 8, 2012, which is incorporated herein by reference in its entirety.

BACKGROUND

This specification relates to information retrieval and image classification.

The Internet provides access to a wide variety of resources, such as image files, audio files, video files, and web pages. A search system can identify resources in response to a text query that includes one or more search terms or phrases. The search system ranks the resources based on their relevancy to the search query and importance and provides search results that link to the identified resources. The search results are typically ordered for viewing according to the rank.

Search systems can rank search results based on relevancy scores that can be determined, in part, based on textual content (or other features) associated with the resource. For example, a relevancy score for a resource can be determined based on a comparison of the query to text included in the resource.

SUMMARY

In general, one innovative aspect of the subject matter described in this specification can be embodied in methods that include the actions of receiving training samples for a particular data dimension, each training sample specifying a training value for the data dimension and a measure of relevance between the training sample and a phrase; determining a value range for the data dimension, the value range being based on the training values specified by the training samples; segmenting the value range into two or more segments, each segment including a proper subset of the value range; training a predictive model for each of the segments, the predictive model for each segment being trained to predict an output based on an input value that is within the segment, the predictive model for each segment being trained based on the training samples and the specified training values included in the segment and the measure of relevance for the training samples; receiving a classification sample that specifies an input value; and computing a classification output based on the input value, the classification output being based on both of: the predictive model for the segment in which the input value is included; and the predictive model for an adjacent segment to the segment in which the input value is included. Other implementations of this aspect include corresponding systems, apparatus, and computer programs, configured to perform the actions of the methods, encoded on computer storage devices.

These and other implementations can each optionally include one or more of the following features. Aspects can further include grouping the training samples to standardized values, the training samples that are grouped to a particular standardized value being those training samples for which the specified training values are within a threshold value of the standardized value; and determining a weight for each standardized value, the weight for the standardized value being based on the training values that are assigned to the training samples that have been grouped to the standardized value.

Training a predictive model for each of the segments can include generating a linear model for each of the segments. The linear model for each segment can be generated based on the standardized values that are included in the segment and the weight for each standardized value that is included in the segment.

Computing a classification output can include assigning the input value to a particular segment, the particular segment being a segment beginning at a first value and ending at a second value, wherein the input value is between the first value and the second value; identifying, as the adjacent segment, a segment, other than the particular segment, including a value that is closest to the input value; determining a first model output based on the input value and the predictive model for the segment in which the input value is included; determining a second model output based on the input value and the predictive model for the adjacent segment; and computing the classification output based on the first model output and the second model output.

Aspects can further include determining a portion of the particular segment that is between the input value and the adjacent segment; and weighting each of the first model output and the second model output based on the portion of the particular segment that is between the input value and the adjacent segment.

Weighting each of the first model output and the second model output can include computing a first product that is a product of the first model output and a fraction indicative of the portion of the particular segment that is between the input value and the adjacent value; and computing a second product that is a product of the second model output and a difference between a baseline value and the fraction. Computing the classification output can include computing a sum of the first product and the second product.

Particular implementations of the subject matter described in this specification can be implemented so as to realize one or more of the following advantages. Image search results can be more accurately ordered according to predictive models based on relevancy of content feature values of images to a query. Multiple predictive models can be trained for each content feature of images to better fit training data. Input content feature values can be applied to multiple predictive models to better predict the relevancy of the input content feature values to a query. Training samples can be grouped to standardized values to reduce the amount of training data for training the predictive models.

The details of one or more implementations of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
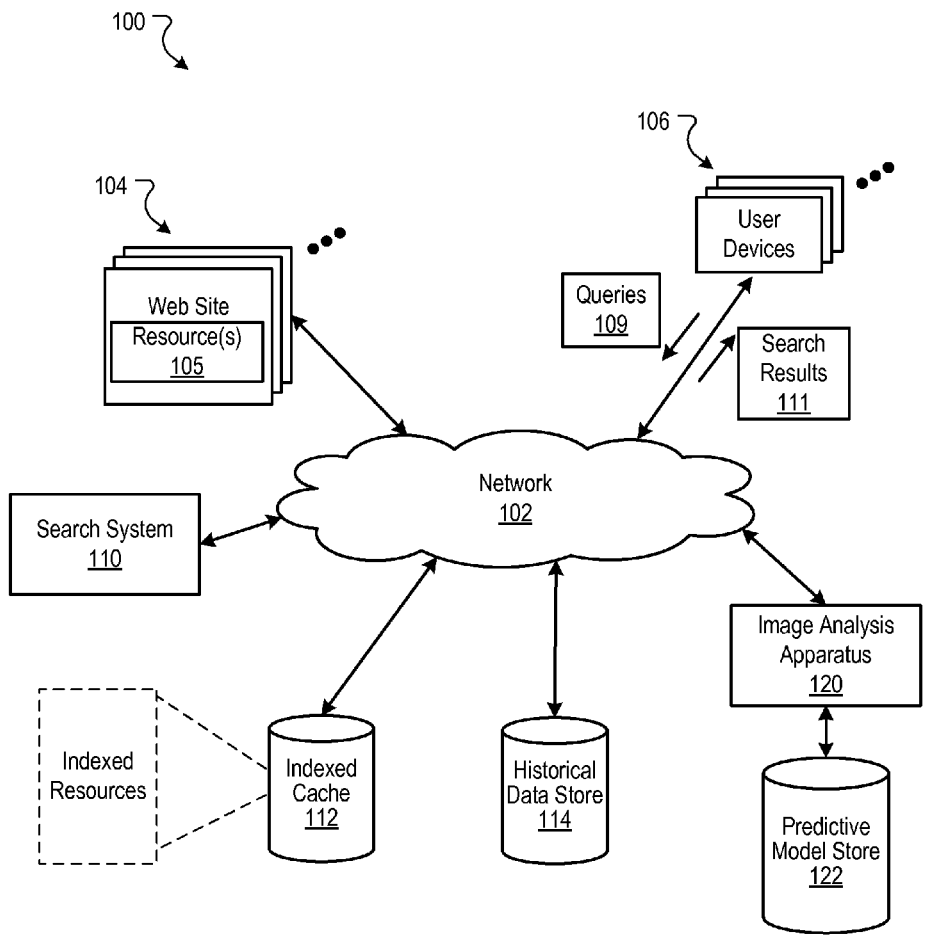
FIG. 1 is a block diagram of an example environment in which a search system provides search services.

FIG. 1 is a block diagram of an example environment 100 in which a search system 110 provides search services. A computer network 102, such as a local area network (LAN), wide area network (WAN), the Internet, a mobile phone network, or a combination thereof, connects web sites 104, user devices 106, and the search system 110. The environment 100 may include many thousands of web sites 104 and user devices 106.

A web site 104 is one or more resources 105 hosted by one or more servers and can be associated with a domain name. An example web site 104 is a collection of web pages formatted in hypertext markup language (HTML) that can contain text, images, multimedia content, and programming elements, such as scripts. Each web site 104 is maintained by a publisher, e.g., an entity that manages and/or owns the web site.

A resource 105 is data provided over the network 102 and that is associated with a resource address. Resources 105 provided by web sites 104 include HTML pages, word processing documents, portable format (PDF) documents, images, video, and feed sources, to name just a few. The resources 105 can include content, such as words, phrases, images, and sound, and may include embedded information, e.g., meta information and hyperlinks, and/or embedded instructions, e.g., scripts.

A user device 106 is an electronic device that is capable of requesting and receiving resources 105 over the network 102. Example user devices 106 include personal computers, mobile communication devices, and other devices that can send and receive data over the network 102. A user device 106 typically includes a user application, such as a web browser, to facilitate the sending and receiving of data over the network 102.

To facilitate searching of resources 105, the search system 110 identifies the resources 105 by crawling and indexing the resources 105 provided on web sites 104. Data about the resources 105 can be indexed based on the resource 105 to which the data corresponds. The indexed and, optionally, cached copies of the resources 105 are stored in an indexed cache 112.

A user device, such as user device 106, can submit a search query 109 to the search system 110. The search system 110 performs a search operation that uses the search query 109 as input to identify resources 105 responsive to the search query 109. For example, the search system 110 may access the indexed cache 112 to identify resources 105 that are relevant to the search query 109. The search system 110 identifies the resources 105, generates search results 111 that identify the resources 105, and returns the search results 111 to the user devices 106.

The search query 109 can include one or more search terms. A search term can, for example, include a keyword submitted as part of a search query 109 to the search system 110 that is used to retrieve responsive search results 111. In some implementations, a search query 109 can include data for a single query type or for two or more query types, e.g., types of data in the query. For example, the search query 109 may have a text portion, and the search query 109 may also have an image portion. A search query 109 that includes data for two or more query types can be referred to as a "hybrid query." In some implementations, a search query 109 includes data for only one type of query. For example, the search query 109 may only include image query data, e.g., a query image, or the search query 109 may only include textual query data, e.g., a text query.

A search result 111 is data generated by the search system 110 that identifies a resource 105 that is responsive to a particular search query 109, and can include a link to the resource 105. An example search result 111 can include a web page title, a snippet of text or an image or portion thereof extracted from the web page, and a hypertext link, e.g., a uniform resource locator (URL) to the web page.

An image search result typically includes a representation of the image referenced by the search result, but may not be the actual referenced image. For example, an image search result may include a reduced-sized version of the referenced image, e.g., a thumbnail image, or a cropped version of the referenced image.

The search results 111 that are identified as relevant to a particular query, e.g., are responsive the query, can be ranked, for example, based on a ranking algorithm used by the search system 110. For example, the search system 110 can retrieve search results 111 based, at least in part, on the search terms or images of a search query 109, and then rank the search results 111 based on one or more additional factors, as described in more detail below.

For a search directed to text, the search results 111 are typically ranked based, in part, on scores related to resources 105 identified by the search results 111, such as information retrieval ("IR") scores, or other relevance scores. In some implementations, the relevance scores are used in combination with quality scores, such as "page rank" scores, to rank the search results 111. The search results 111 are ordered according to these scores and are provided to the user device 106 according to the order.

The user devices 106 receive the search results pages and render the pages for presentation to the users. In response to the user selecting a search result 111 at a user device 106, the user device 106 requests the resource identified by the resource locator included in the search result 111. The web site 104 hosting the resource 105 receives the request for the resource 105 from the user device 106 and provides the resource 105 to the requesting user device 106.

Data for the search queries 109 submitted during user sessions are stored in a data store, such as the historical data store 114. For example, the search system 110 can store received search queries in the historical data store 114. For search queries 109 that are in the form of text, the text of the query is stored in the historical data store 114. For search queries 109 that are in the form of images, an index of the images is stored in the historical data store 114, or, optionally, the image is stored in the historical data store 114.

Selection data specifying actions taken in response to search results 111 provided in response to each search query 109 are also stored in the historical data store 114, for example by the search system 110. These actions can include whether a search result 111 was selected, e.g., clicked or hovered over, and for each selection, for which search query 109 the search result 111 was provided. As used herein, an image that is referenced in a search result is considered to be selected when a user interaction with the search result referencing the image has been determined to have occurred. In some implementations, the query data are stored in a query log and the selection data are stored in a separate selection log. In some implementations, the data stored in the historical data store, the query log, and/or the selection log are anonymized.

The data stored in the historical data store 114 can be used to map search queries 109 submitted during search sessions to resources 105 that were identified in search results 111 and the corresponding selection data. For example, the historical data can map how many times a search result for each image indexed in the indexed cache 112 has been selected when presented in response to a particular query.

The environment 100 also includes an image analysis apparatus 120 that classifies, ranks, and/or or scores images for search queries. Although illustrated and described throughout this document as a separate apparatus, the image analysis apparatus 120 may be implemented as a part of the search system 110.

For search queries directed to images, the search system 110 can interact with the image analysis apparatus 120 to rank images for referencing as search results. In general, the image analysis apparatus 120 ranks images for a query based on a relevance score for each image with respect to the query. The relevance scores are a measure of the relevance of the images to the received query. For example, an image having a relevance score that is higher than the relevance score of another image may be considered more relevant to the query than the other image.

The image analysis apparatus 120 can determine a relevance score for an image and a query using one or more predictive models for the query. The predictive model(s) for a particular query can be trained using content feature values of training images for which a relevance value is available. For example, the predictive model can be trained for a particular query with a set of training images, also referred to as training samples, that have been previously labeled as relevant to the query or not relevant to the query. The trained predictive model(s) can then be applied to content feature values of other images, e.g., unlabeled images, to determine a relevance score for the other images relative to the query.

In general, a content feature is a visual characteristic of a portion of an image, such as color, histograms of image color or grayscale data, texture, edges, corners, geometric information, image centers of gravity, and other characteristics of a portion of the image. A content feature value is a value indicative of a corresponding visual characteristic of a portion of an image. For example, a content feature value of a color content feature may be a value indicative of the color blue at a particular location or three values indicative of the average color for a region.

In some implementations, the image analysis apparatus 120 trains a set of predictive models, e.g., one or more predictive models, for each query and stores the predictive models in a predictive model store 122. For example, the image analysis apparatus 120 may train one or more predictive models for each data dimension in a set of data dimensions. In some implementations, each data dimension of the set of data dimensions corresponds to a different content feature for images. For example, one data dimension may correspond to a color of a portion of the image and another data dimension may correspond to a texture at the same portion or another portion of the image, while still another dimension may correspond to edge locations in the image.

After training the predictive models for a query, the image analysis apparatus 120 can use the predictive models to determine a relevance score for input images and the query. In some implementations, the image analysis apparatus 120 extracts content feature values for an image and determines a classification output for each content feature value based on the content feature value and one or more predictive models for the data dimension that corresponds to the content feature value. A classification output for a data dimension is a value indicative of the relevance of the content feature value for that data dimension to the query. The image analysis apparatus 120 can combine the classification outputs for all data dimensions, or a proper subset thereof, of the image to determine the relevance score for the image and the query, as described in further detail below.

As noted above, the image analysis apparatus 120 can train the predictive models for a query using training images for which a relevance measure for the query is available. For example, the image analysis apparatus 120 may identify images for which a relevance feedback score for the query is available. The relevance feedback score is a relevance measure that is generated based on user actions in response to presentation of the image. For example, the relevance feedback score can be a measure of relevance for an image that has been represented by search results that were provided in response to a particular query. For example, click data specifying a number of times a search result referencing a particular image has been selected from search results for the query can represent a measure of relevance of the image to the query. The image analysis apparatus 120 can derive the relevance measure from the information stored in the historical data store 114.

Alternatively, or additionally, the relevance feedback score can be a user specified indication of relevance for the image relative to a phrase, e.g., one or more words. For example, users can assign text labels to images, and the frequency with which users assign each label to the image can be used as a measure of relevance for the image relative to the text label. To illustrate, assume that an image of a white poodle is presented to users, and 40% of the users assign the image a text label that includes the term "fluffy", while 80% of the users assigned the image a text label of "white poodle". In this example, the image of the white poodle may be considered more relevant to the phrase "white poodle" than the phrase "fluffy", such that the relevance score for the image relative to the phrase "white poodle" is higher than the relevance score for the image relative to the phrase "fluffy".

Figure 2:
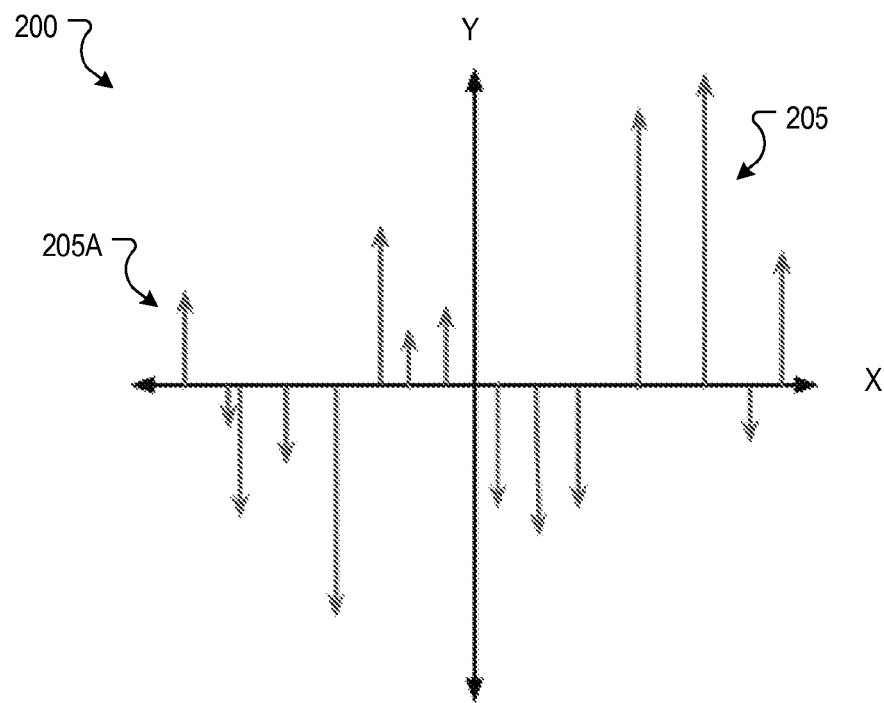
FIG. 2 depicts a graph of example training samples for training a predictive model for a particular query.

FIG. 2 depicts a graph 200 of example training samples 205 for training a predictive model for a particular query. In particular, the training samples 205 are for a particular data dimension, such as a color content feature of a particular region of an image. Each training sample 205 includes a content feature value for the data dimension that has been extracted from a training image for which a relevance measure of the training image to the query is available. Each training sample 205 also includes the relevance measure for its corresponding image or images.

In the example graph 200, the x-axis corresponds to content feature values for the data dimension and the y-axis corresponds to the relevance measures of the training images. A training sample 205, such as training sample 205A, that has a relevance measure with a positive value, as represented by an upwards pointing arrow, is considered relevant to the query and is referred to as a positive training sample. Meanwhile a training sample 205 that has a relevance measure with a negative value, as represented by a downward pointing arrow, is considered to be not relevant to the query and is referred to as a negative training sample. The length of each arrow for each content feature value indicates the magnitude of the relevance measure for images having the corresponding content feature value.

Figure 3:
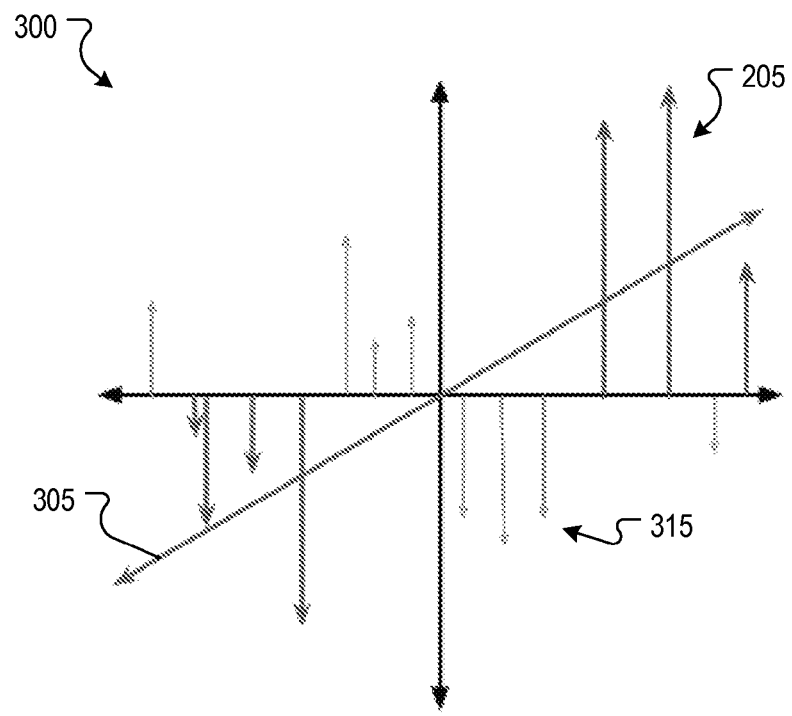
FIG. 3 depicts another graph of the training samples of FIG. 2 and includes a representation of an example linear model that may be trained using the training samples.

A predictive model can be trained for the data dimension based on the training samples 205. For example, FIG. 3 depicts another graph 300 of the training samples 205 of FIG. 2 and includes a representation of an example linear model 305 that may be trained using the training samples 205. This example model 305 is a single linear model that may be trained using the content feature values and the relevance measures for the training samples 205. As can be seen in the graph 300, the accuracy of the model 305 may vary over the set of training samples 205. For example, the negative training samples 315 indicate that the content feature values just right of the origin have a negative relevance measure for the query, while the model 305 indicates that those feature values are relevant. In other words, the model 305 would output a positive relevance measure for images having the content feature values just to the right of the origin, while the training samples have negative relevance measures. Thus, images that are not relevant to the query may be improperly identified as relevant to the query using the model 305.

Figure 4:
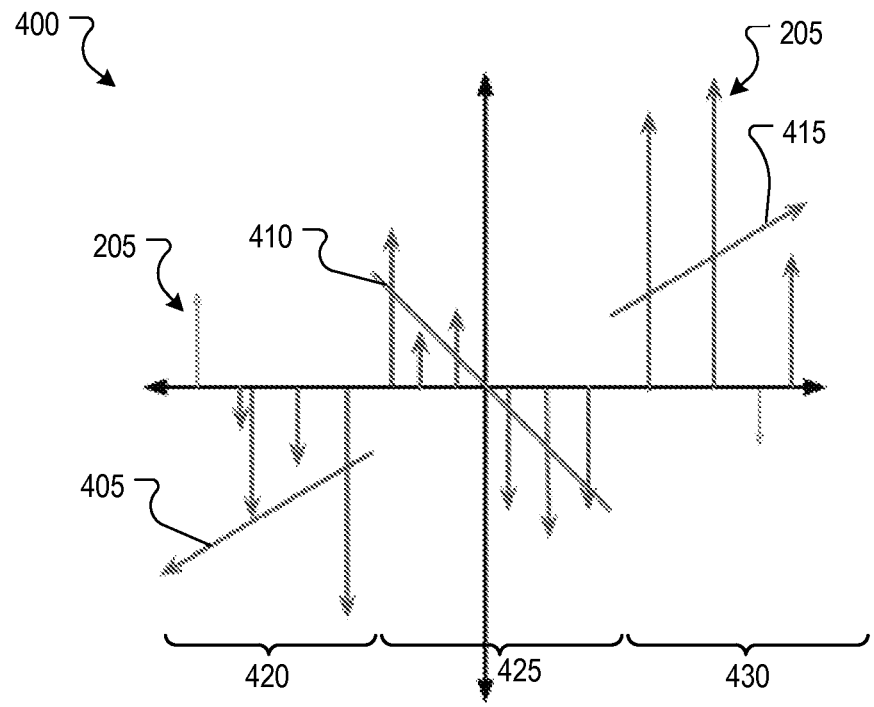
FIG. 4 depicts another graph of the training samples of FIG. 2 and representations of multiple example linear models that may be trained using the training samples.

To increase the accuracy with which the relevance of an image can be determined, the image analysis apparatus 120 can train multiple predictive models using the training inputs 205 rather than training a single linear predictive model. FIG. 4 depicts another graph 400 of the training samples 205 of FIG. 2 and representations of multiple linear models 405, 410 and 415 that may be trained using the training samples 205.

In some implementations, the image analysis apparatus 120 segments the training inputs 205 into multiple segments 420, 425, and 430, and then trains a predictive model for each of the segments 420, 425, and 430. For example, a predictive model 405 can be trained using the training samples that are in the segment 420, while predictive models 410 and 415 can be trained using the training samples that are in the segments 425 and 430, respectively.

The predictive model for each segment is trained to predict a classification output for content feature values that fall within the segment. For example, if the content feature value falls within the range of the segment 420, the image analysis apparatus 120 may apply the model 405 to the content feature value to determine the classification output for that content feature value. Similarly, the image analysis apparatus 120 can apply the model 410 to content feature values that are within the range of the segment 425, and apply the model 415 to the content feature values that are in the range of the segment 430.

Segmenting training inputs 205 into multiple segments and training a separate predictive model for each segment enables the image analysis apparatus 120 to generate predictive models 405, 410, and 415 that can more closely fit the training inputs 205 and more accurately predict the relevance of an input content feature value to a query. For example, the classification output from the model 410 will be a negative relevance measure for images having content feature values in segment 425 that are right of the origin. Thus, the classification output of the model 410 for the images having content feature values in segment 425 will be more accurate than the classification output of the model 305.

As illustrated by FIG. 4, there may be hard decision boundaries between adjacent predictive models 405, 410, and 415, such that there are discontinuities between two adjacent models, e.g., predictive model 405 and 410. The discontinuity between adjacent predictive models 405-415 can be removed using interpolation techniques. In some implementations, the interpolation techniques can include computing a classification output for a particular classification sample, e.g., a sample that is received for classification, using the two predictive models for the two segments that include values closest to the content feature value for the classification input. For example, assume that a classification sample having a content feature value that is within the range of segment 420 is received for classification. In this example, the classification output can be computed using both of the model 405 that has been trained for segment 420, and the model 410 that was trained for the segment 425, which is the next closest segment to the content feature value for the received classification sample.

Figure 5:
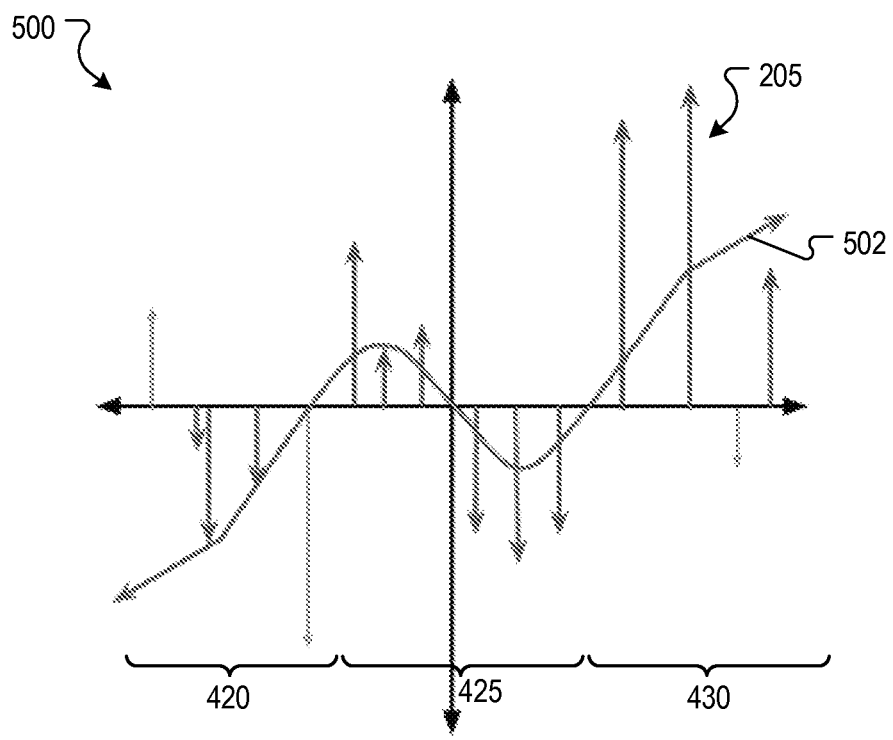
FIG. 5 is another graph of the training samples of FIG. 2 and a series of example models that are merged using interpolation.

When the models for the two closest segments are used to compute the classification output, the resulting model over the range of segments 420, 425, and 430 is a continuous model 502, as depicted by FIG. 5. As illustrated by FIG. 5, the interpolation between adjacent models, e.g., model 405 and 410, removes the discontinuities of the resulting model, thereby reducing the variance of classification outputs for input content feature values that are near a discontinuity. For example, with reference to FIG. 4, the classification output for a classification sample can vary significantly based on whether the classification sample is determined to be included in the segment 420 or the segment 425. However, the classification output for the continuous model 502 will not vary as much over a small range of content feature values.

As described in more detail below, the contribution of each of the two models to the classification output can be weighted based, for example, on the distance between the content feature value and the adjacent segment. For example, the contribution of the model 410 to the classification output for a sample that is within the segment 420 may increase as the content feature value approaches the segment 425.

Figure 6:
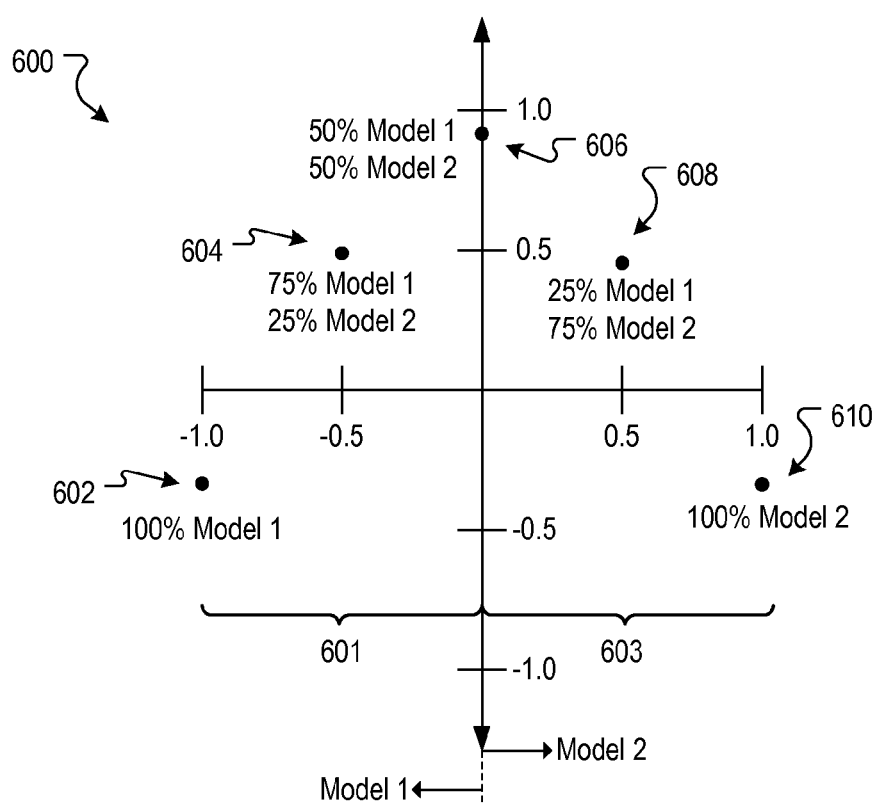
FIG. 6 is a graph that depicts classification samples for which two example predictive models are used to compute a classification output for a data dimension.

FIG. 6 is a graph 600 that depicts classification samples for which two example predictive models, Model 1 and Model 2, are used to compute a classification output for a data dimension. In this example, Model 1 is a model that has been trained using training samples having content feature values that are within segment 601, which ranges from −1.0 to 0.0, and Model 2 is a model that has been trained using training samples having content feature values that are within segment 603, which ranges from 0.0 to 1.0.

Depending on the content feature value of a classification sample, one or both of the models may be used to determine the classification output for the classification sample. For example, the contribution of Model 2 to the classification output for a classification sample that is included in segment 601 can increase as the content feature value for the classification sample approaches 0.0. Meanwhile the contribution of Model 1 to the classification output can decrease as the contribution of Model 2 increases.

In some two model implementations, the classification output for an image content feature value at an end of the model's segment that is farthest from the other model's segment may be computed using only the model for the segment in which the image content feature value is included. For example, the image analysis apparatus 120 may determine the classification output for classification sample 602 by applying only Model 1 to classification sample 602, as the classification sample 602 has a content feature value of −1, which is the value in segment 601 that is farthest from segment 603. Thus, in this example, the contribution of Model 1 to the classification output will be 100%, while the contribution of Model 2 will be 0%.

Similarly, the image analysis apparatus 120 may determine the classification output for the classification sample 610 by applying only Model 2 to the classification sample 610, as the classification sample 610 has a content feature value of 1.0, which is the value in segment 603 that is farthest from segment 601.

The classification outputs for classification samples having content feature values that are between −1.0 and 1.0, non-inclusive, may be computed using outputs from both predictive models Model 1 and Model 2. The outputs of the two predictive models may be combined to determine the classification output for the classification sample. For example, the classification output may be the sum, average, weighted sum, or weighted average of the two model outputs.

For a weighted sum or weighted average classification output, the output for each model may be weighted, for example based on the value of the content feature value for the classification sample and that value's position with respect to one or more segments. For example, the weighting for a model may be higher for a content feature value within the segment for which the model was trained than for a content feature value that is in another segment for which another model was trained. The segment for which a model was trained is also referred to as a model segment.

In some implementations, the weighting of a model output for a content feature value that is located within the model segment for the model is based on a portion of the model segment between the content feature value and an adjacent model segment for a different model that is also used to determine the classification output, as described in detail below with reference to FIG. 10.

In some implementations, the weighting for the predictive models may be determined according to a linear function. For example, the weighting for Model 1 may decrease linearly from a weighting of 100% for a content feature value of −1.0 to a weighting of 0.0% for a content feature value of 1.0. Similarly, the weighting for Model 2 may decrease linearly from a weighting of 100% for a content feature value of 1.0 to a weighting of 0.0% for a content feature value of −1.0.

By way of example, the classification sample 604 has a content feature value of −0.5, which is in the middle of the model segment for Model 1, e.g., segment 601. In this example, the output of Model 1 is weighted by 75%, while the output of Model 2 is weighted by 25% because the classification sample is in the middle of segment 601.

The image analysis apparatus 120 can apply Model 1 to the classification sample 604 to determine a first model output and apply Model 2 to the classification sample 604 to determine a second model output. The image analysis apparatus 120 can then combine a weighted version of the first model output with a weighted version of the second model output to determine the classification output for the classification sample 604. For example, as the classification sample 604 is in the middle of the model segment for Model 1, e.g., segment 601, the first model output may be weighted at 75% while the second model output may be weighted at 25%. The weighted classification outputs can be combined by summing or averaging, for example, to determine the classification output for the classification sample 604.

Similar to the classification sample 604, the classification sample 608 has a content feature value that is in the middle of the model segment for Model 2, e.g., segment 603. Thus, both models may be applied to the classification sample 608 and the model outputs for both models can be weighted, e.g., 75% for Model 2 and 25% for Model 1, and combined to determine the classification output for the classification sample 608.

The classification output for a classification sample having a content feature value that is at the boundary between the two models, such as the classification sample, 606, can also be computed using both models. In this example, the model output from both models may be weighted at 50% and combined to determine the classification output for the classification sample 606.

Figure 7:
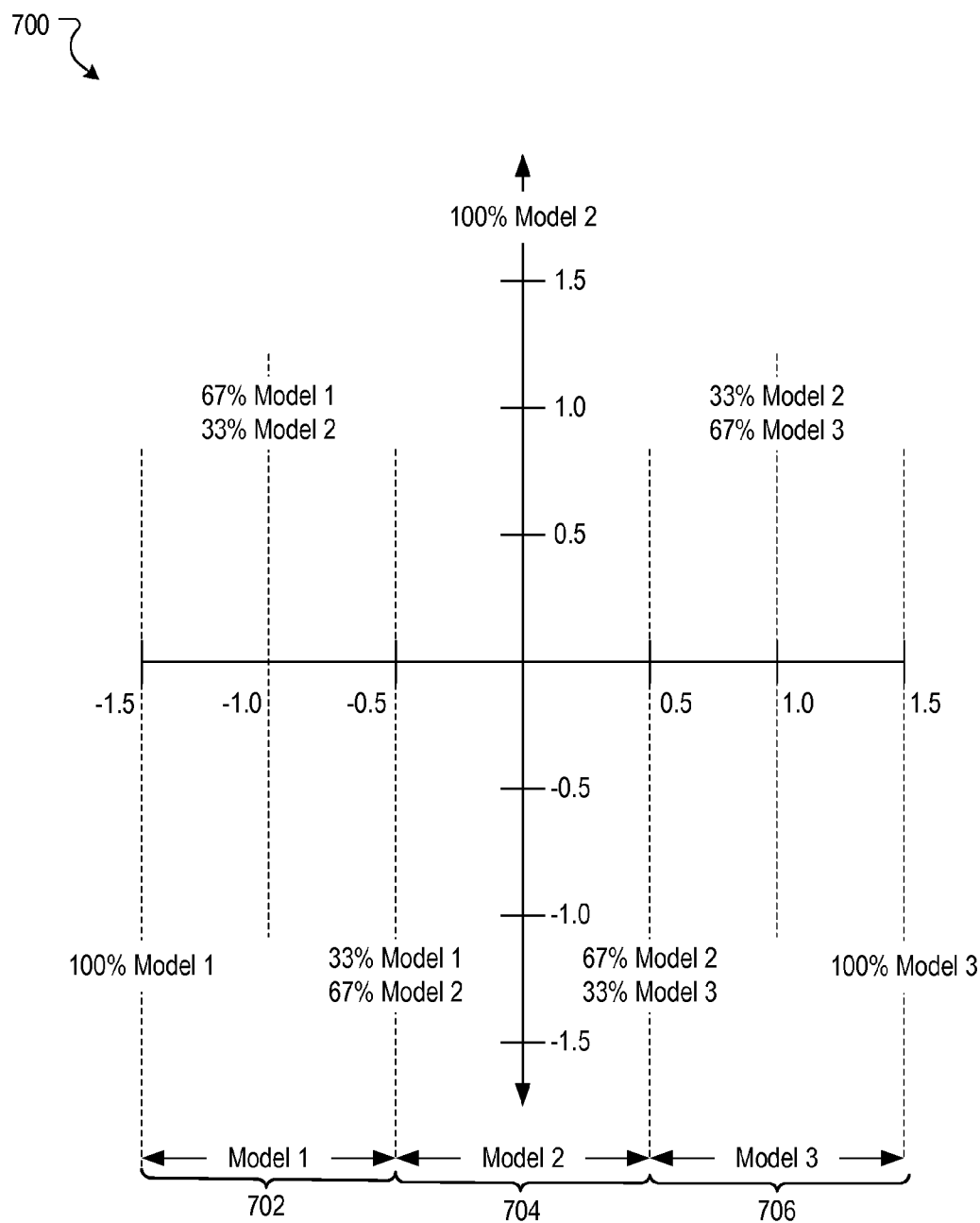
FIG. 7 is a graph that depicts three segments of a data dimension for which example predictive models have been trained.

FIG. 7 is a graph 700 that depicts three segments 702, 704, and 706 of a data dimension for which example predictive models have been trained. As illustrated by graph 700, Model 1 has been trained using training samples having content feature values between −1.5 to −0.5; Model 2 has been trained using training samples having content feature values between −0.5 to 0.5; and Model 3 has been trained using training samples having content feature values between 0.5 and 1.5.

In the example three model implementation, the image analysis apparatus 120 can use a single model for classification samples having content feature values of −1.5, 0.0, or 1.5. In particular, Model 1 can be used to determine a classification output for a classification sample having a content feature value of −1.5 as this value is at an end of the model segment for Model 1, e.g., segment 702, and this model segment does not border another model segment. Similarly, Model 3 can be used to determine a classification output for a classification sample having a content feature value of 1.5 as this value is at an end of the model segment for Model 3, e.g., segment 706, that does not border another model.

In some implementations, because Model 2 borders Model 1 on one side and Model 3 on the other side, the classification output for a classification sample having a content feature value at the middle of Model 2, e.g., at 0.0, may be computed using only Model 2 since segment 702 and segment 706 are both equidistance from the content feature value for the classification sample. In some implementations, the classification output for a classification sample having a content feature value at the middle of a model segment that is bordered on both sides by other model segments may be computed using the models for both bordering model segments.

For example, the classification output for a classification sample having a content feature value of 0.0 may be computed using each of Models 1-3 and the model outputs for each of the predictive models may be weighted and combined to determine the classification output for the classification sample. For instance, the output of Model 2 may be given a weight of 50%, while the output of Model 1 and the output of Model 3 may each be given a weight of 25%.

In the illustrated example, Models 1 and 2 are used to determine the classification output for classification samples having content feature values between −1.5 and 0.0. For example, the image analysis apparatus 120 may apply Model 1 to a classification sample having a content feature value in this range to determine a first model output and also apply Model 2 to the classification sample to determine a second model output. The first and second outputs can be weighted and combined to determine the classification output for the classification sample. The weighting for the output of each predictive model can depend on the value of the content feature value of the classification sample. For example, the output of Model 1 for a classification sample having a content feature value of −1.0 may be weighted at 67% and the output of Model 2 for the classification sample having the content feature value of −1.0 may be weighted at 33%.

The weighting of the outputs of Models 1 and 2 for classification samples having content feature values between −1.5 and 0.0 may be determined according to a linear function. For example, the weighting for Model 1 may decrease linearly from a weighting of 100% for a classification sample having a content feature value of −1.5 to a weighting of 0.0% for a classification sample having a content feature value of 0.0. Similarly, the weighting for Model 2 may decrease linearly from a weighting of 100% for a classification sample having a content feature value of 0.0 to a weighting of 0.0% for a classification sample having a content feature value of −1.5. In this example, the total weighting for both models sum to 100% at any point along the value range of −1.5 to 0.0. However, other weighting techniques can also be used.

In this example, Models 2 and 3 are used to determine the classification output for classification samples having content feature values between 0.0 and 1.5. For example, the image analysis apparatus 120 may apply Model 2 to a classification sample having a content feature value in this range to determine a first model output and also apply Model 3 to the classification sample to determine a second model output. The first and second model outputs can be weighted and combined to determine the classification output for the classification sample. The weighting for the output of each predictive model can depend on the value of the content feature value for the classification sample. For example, the output of Model 2 for a classification sample having a content feature value of 0.5 may be weighted at 67% and the output of Model 3 for the classification sample having the content value of 0.5 may also be weighted at 33%.

The weighting of the outputs of Models 2 and 3 for classification samples having content feature values between 0 and 1.5 may be determined according to a linear function. For example, the weighting for Model 2 may decrease linearly moving from a content feature value of 0 to 1.5, while the weighting for Model 3 may increase linearly moving along the same value range. In this example, at any point between 0 and 1.5, the combined weighting for the two predictive models adds up to 100%.

For example, the weighting for Model 2 may decrease linearly from a weighting of 100% for a classification sample having a content feature value of 0.0 to a weighting of 0.0% for a classification sample having a content feature value of 1.5. Similarly, the weighting for Model 3 may decrease linearly from a weighting of 100% for a classification sample having a content feature value of 1.5 to a weighting of 0.0% for a classification sample having a content feature value of 0.0. In this example, the total weighting for both models sum to 100% at any point along the value range of 0.0 to 1.5.

FIGS. 6 and 7 provide example two model and three model implementations respectively. Some implementations may employ more models per data dimension, such as four models per data dimension. Although the total value range for the example implementations of FIGS. 6 and 7 are segmented into equal sized segments for which to train and use a predictive model, some implementations may include differing segment sizes. For example, a two model approach for a value range of −1.0 to 1.0 may include a first model for the range from −1.0 to −0.5 and a second model for the value range of −0.5 to 1.0.

Figure 8:
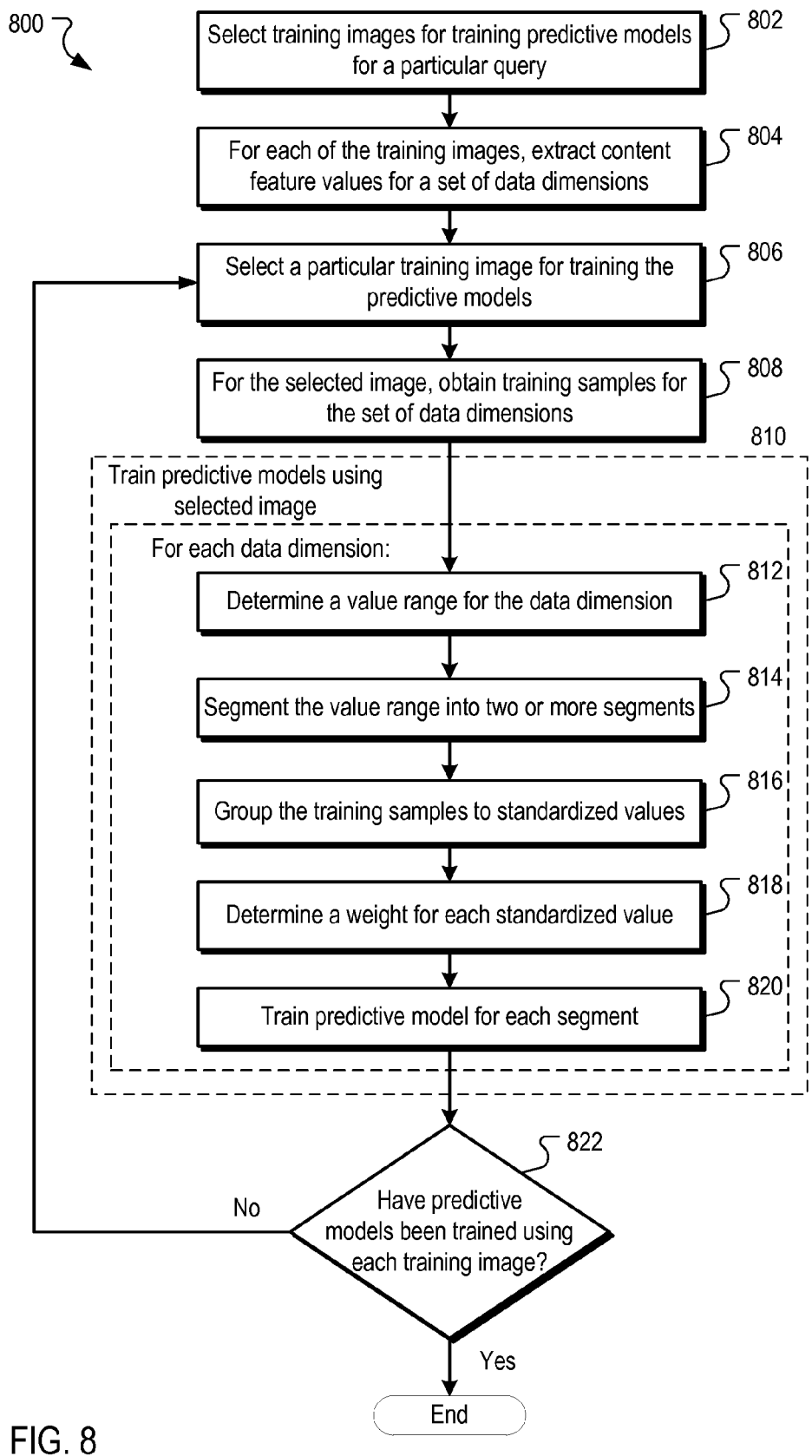
FIG. 8 is a flow chart of an example process for training predictive models for a particular query.

FIG. 8 is a flow chart of an example process 800 for training predictive models for a particular query. In this example process 800, the image analysis apparatus 120 trains multiple predictive models for each of a set of data dimensions. Each data dimension corresponds to a particular content feature of an image, such as color or texture of a portion of the image.

Training images are selected for the query (802). In some implementations, the training images selected for a particular query include images that are identified as being relevant to the particular query and images that are identified as being relevant to other unique queries, or likely not relevant to the particular query. For example, training images for the query "squirrels" may include images that are relevant to the query "squirrels" and training images that are relevant to the query "trucks." Including images that are relevant to the query as well as images that are relevant to another query enables the predictive models to be trained with content feature values of images that are relevant to the query as well as images that are likely not relevant to the query. Training the predictive models with images that are identified as relevant to another unique query rather than images that are identified as not being relevant to the query, increases the likelihood that the quality of the images being used to train the predictive models is higher than images that might otherwise be used to train the predictive models.

In some implementations, the image analysis apparatus 120 can identify images that are relevant to a query based on a relevance threshold for the query. The relevance threshold is a minimum relevance measure between the image and the query used to identify an image that is relevant to the query. For example, the image analysis apparatus 120 can identify images that have been selected from image search results for the query a minimum number of times, e.g., at least 10 times, as being relevant to the query. Other relevance thresholds can also be used. For example, the image analysis apparatus 120 can identify images as being relevant to the query based on selection of images from search results a minimum percentage of a total number of times the search results are presented.

In some implementations, the training images that are selected include training images that have been identified as relevant to the query and other images that have been explicitly identified as not being relevant to the query. For example, user feedback or manual labeling of the images can be used to specify whether a particular image is relevant to a particular query or not relevant to the particular query. The training images can be selected, for example, from a data store that stores images and data specifying queries to which the images are and/or are not relevant.

Content feature values for the training images are extracted (804). In some implementations, a set of data dimensions are identified for use in training the predictive models for the query. For each data dimension, the image analysis apparatus 120 can extract a corresponding content feature value from each training image. Each extracted content feature value can be stored, e.g., in the predictive model data store 122, with a reference to its corresponding image and corresponding data dimension. Each content feature value can also be stored with reference to the relevance measure for the image from which the content feature was extracted.

A particular training image is selected for training predictive models (806). For example, the image analysis apparatus 120 may select one of the training images that were selected for the query. As the predictive models can be trained using each of the selected training images, the image analysis apparatus 120 may select the training image according to a predefined order or on a pseudorandom basis.

Training samples for a set of data dimensions are obtained for the selected training image (808). In general, each training sample specifies a training value for the selected data dimension, e.g., a content feature value, and a relevance measure for the training image from which the training value was extracted. The relevance measure can specify, for example, whether the training image is a positive training sample or a negative training sample. For example, the relevance measure can be indicative of whether the training image has been identified as relevant to the particular query or whether the training image has been identified as not relevant to the query.

The training samples can be obtained from the extracted content feature values stored in the predictive model data store 122. For example, the image analysis apparatus 120 can access the predictive model data store 120 to identify, as the training samples, the content feature values for the selected data dimension that were extracted from the selected training image. The image analysis apparatus 120 can determine which content feature values reference the selected training image and the query and identify those content feature values as the training samples.

A set of predictive models is trained for each data dimension of the set of data dimensions using the training values for the selected training image (810). For example, the set of predictive models may be trained by executing constituent operations 812-820 for each data dimension of the set of data dimensions.

For each data dimension, a value range is determined for the data dimension (812). In some implementations, the value range for a data dimension is based on the training values for that data dimension, across all of the training images used to train the predictive models. For example, the image analysis apparatus 120 may set the lower end of the value range to the value of the smallest training value. Similarly, the image analysis apparatus 120 may set the higher end of the value range to the value of the largest training value.

In some implementations, the predictive models are trained for each training image sequentially. Thus, the final value range for a data dimension may not be known until the predictive models for that dimension has been trained using all training images from which the predictive models are to be trained. The value range for a data dimension may change in response to obtaining a training sample having a training value that is outside the current value range for the data dimension. For example, if the current value range of a data dimension is −1.0 to 1.0 and the training value for the data dimension of the selected training image is −1.1, the value range may be updated to −1.1 to 1.0.

The value range for the data dimension is segmented into multiple segments (814). The image analysis apparatus 120 can be configured to segment the value range into multiple segments. In some implementations, the number of segments for the data dimension is preset, for example by a system designer or administrator. For example, a system designer may specify that three predictive models are to be trained for each data dimension. In such an example, the image analysis apparatus 120 may segment the value range for each data dimension into three segments. In some implementations, the number of segments for a data dimension may be based on the size of the value range for the data dimension. For example, each segment may be a predefined size and the number of segments for the data dimension may be based on the number of segments that fit the value range for the data dimension.

In some implementations, the value range for each data dimension is segmented into equal sized segments. For example, a value range of 1-9 may be segmented into a first segment for the values 1-3, a second segment for the values 4-6, and a third segment for the values 7-9. In some implementations, the value range for each data dimension is segmented into un-equal sized segments.

In some implementations, the training samples are grouped to standardized values (816). For example, rather than persisting each training sample to memory for subsequent iterations of training the predictive models, each training sample can be grouped to a standardized value and each standardized value can be weighted based on the training samples grouped therein, as described below. A standardized value is a value for which training samples having a training value within a threshold value of the standardized value are grouped. In some implementations, grouping the training samples to standardized values may be accomplished by quantization or by rounding the training values of the training samples.

By way of example, with reference to FIG. 6, assume that the segment for Model 1 has standardized values in 0.2 unit increments from the value of −1.0 to the value of 0.0. In this example, the standardized values would be −1, −0.8, −0.6, −0.4, −0.2, and 0. An appropriate threshold value for this example may be 0.1. Thus, any training sample within a value of 0.1 of a standardized value is grouped with that standardized value. For example, a training sample with a training value of −0.95 would be grouped with the standardized value of −1. By way of another example, a training sample with a training value of −0.1 may be grouped with either or both of the standardized value of 0 or −0.2. The image analysis apparatus 120 may be configured to group training samples that qualify for two standardized values to the standardized value that is greater than the training value for the training sample or the standardized value that is less than the training value for the training sample. Or, the image analysis apparatus 120 may be configured to group the training sample to both standardized values.

A weight is determined for each standardized value (818). For example, the image analysis apparatus 120 may determine a weight for a standardized value based on the relevance measure for each training sample grouped to the standardized value and/or the training value for the training sample. The weight for the standardized value may be based on the sum, average, weighted sum, or weighted average of the relevance measures for the training values grouped to the standardized value.

By way of example, consider a standardized value "SV" of 0.2 having a first training sample "TS1" and a second training sample "TS2" grouped thereto. Consider further that TS1 has a relevance measure of +5 and a training value of 0.15 and that TS2 has a relevance measure of +3 and a training value of 0.21. In some implementations, the image analysis apparatus 120 may determine the weight for the standardized value SV by summing the relevance measures, e.g., (+5)+(+3)=+8. If another training sample "TS3" is grouped with the standardized value SV, for example in response to training the predictive models using another training image, the weight of the standardized value SV can be updated based on the relevance measure for the training sample TS3. For example, if the training sample TS3 has a weight of "−1," then the weight of the standardized value SV may be updated to (+8)+(−1)=+7.

For implementations in which the weight of a standardized value is based on an average of training values grouped with the standardized value, the image analysis apparatus 120 may maintain a current weight for the standardized value SV and a count of the number of training samples grouped with the standardized value. When a new training sample is grouped with the standardized value, the image analysis apparatus 120 can determine the weight of the standardized value using the current weight of the standardized value, the count of the number of training samples grouped with the standardized value, and of the training value of the new training sample. For example, if the current weight of the standardized value SV is +7 for three training samples and a fourth training sample "TS4" having a training value of +4 is grouped with the standardized value SV, the updated weight of the standardized value SV may be $(((+7*3)+(+4))/4)$, where the denominator is the total number of training samples grouped with the standardized value SV.

In some implementations, the weight for the standardized value SV is based on a weighted average of the relevance measures. The weighting of each relevance measure may be based on the difference between the training value for the relevance measure and the standardized value SV. A training value closer to the standardized value SV may be given a greater weight. For example, the training value for TS2 may be given a higher weight in a weighted average computation than the training value for TS1 as the training value of TS2 is closer to the standardized value SV than the training value for TS1.

By grouping the training samples to standardized values and determining a weight for the standardized values, the image analysis apparatus 120 can reduce the amount of training data stored and used for training the predictive models. For example, hundreds of training samples may be grouped into a single standardized value and that single standardized value may represent the hundreds of training samples in training a predictive model. However, some precision in the predictive model may be sacrificed relative to the amount of training samples. Thus, the number of standardized values may be increased to increase precision or decreased to reduce data processing requirements in some implementations.

A predictive model is trained for each segment (820). For implementations that group the training samples to standardized values, the image analysis apparatus 120 can train a predictive model for each segment of the data dimension using the standardized values that are within the value range of the segment and the weights for those standardized values. For example, the image analysis apparatus 120 can train a linear model for each segment using the standardized values within the segment and their weights.

For implementations that use the training values rather than standardized values, the image analysis apparatus 120 can train a model for each segment using the training values that are within the value range of the segment and the relevance measures for those training values. For example, the image analysis apparatus 120 may train a linear model for each segment using the training values for the segment and their relevance measures.

A determination is made whether predictive models have been trained using each training image (822). For example, the image analysis apparatus 120 can determine whether predictive models have been trained using training samples of each training image selected for the query. If predictive models have not been trained using each training image, another training image is selected for training predictive models (806). If predictive models have been trained using each training image, the process 800 ends.

The example process 800 of FIG. 8 has been described largely in terms of training predictive models for each data dimension independently of other data dimensions. In some implementations, the predictive models for each data dimension are trained collectively. In some implementations, a training sample may have a training value that falls within two or more data dimensions. Thus, the training sample may affect the training of the predictive models for each of those two or more data dimensions.

Figure 9:
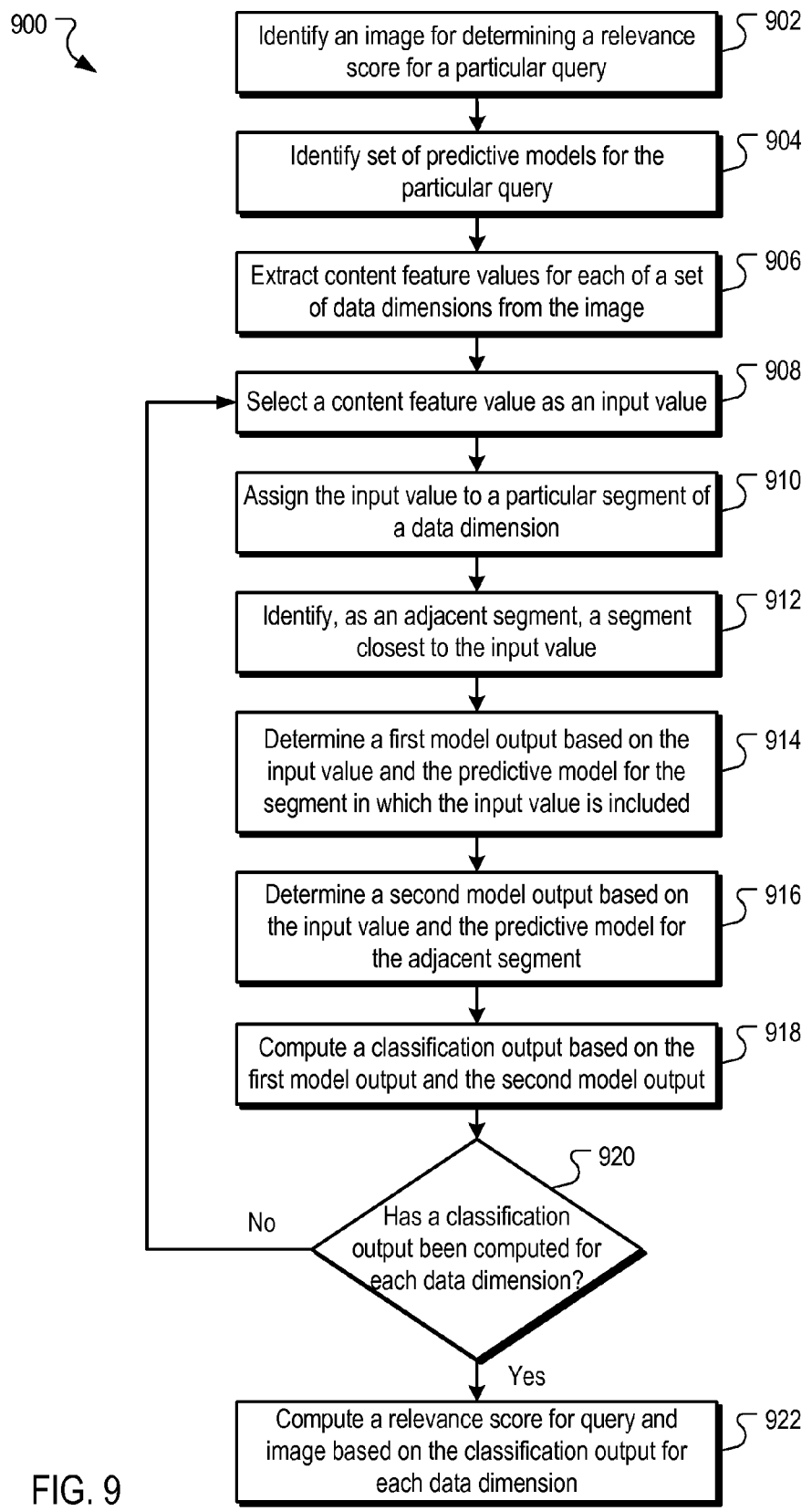
FIG. 9 is a flow chart of an example process for determining a relevance score for an input image and a query.

FIG. 9 is a flow chart of an example process 900 for determining a relevance score for an input image and a query. FIG. 9 is described with reference to FIG. 7 to provide examples of certain elements described with reference to process 900.

An input image is identified (902). For example, a set of candidate images may be identified for which to determine a relevance score. These candidate images may be identified by the search system 110 and provided to the image analysis apparatus 120. The image analysis apparatus 120 can select an input image from the set of candidate images. For example, the image analysis apparatus 120 may select an input image based on a relevance measure provided by the search system 110, e.g., the input image having the highest relevance measure, or pseudorandomly.

A set of predictive models are identified for the query (904). For example, the image analysis apparatus 120 may identify predictive models stored in the predictive model store 122 that reference the query. As described above, the image analysis apparatus 120 can train a set of predictive models for each query and store the predictive models in the predictive model store 122 with a reference to the query.

Content feature values are extracted from the input image for each data dimension in a set of data dimensions (906). For example, each predictive model of the set of predictive models may be trained to determine an output for a particular data dimension or a segment of a particular data dimension. Each data dimension corresponds to a particular content feature of an image, such as a color for a portion of an image or a texture of a portion of an image. The image analysis apparatus 120 can extract a content feature value for each data dimension that a predictive model of the set of predictive models has been trained.

A content feature value is selected as an input value (908). For example, the image analysis apparatus 120 may determine a classification output for each extracted content feature value and combine the classification outputs to determine a relevance score for the input image. The image analysis apparatus 120 may order the content feature values and may select content feature values for scoring according to the order. Or, the image analysis apparatus 120 may score each image content feature value simultaneously.

The input value is assigned to a particular segment of a data dimension (910). For example, the input value may correspond to a color for a particular portion of an image. The image analysis apparatus 120 may determine the data dimension for the input value and identify the predictive models for the particular data dimension and the value ranges for each identified predictive model. The value range for each predictive model of the data dimension defines a segment of an overall value range for the data dimension.

The image analysis apparatus 120 can compare the input value to the value range for each predictive model for the data dimension to determine which value range the input value falls within. For example, with reference to FIG. 7, if the input value is −1.0, the input value would fall within the value range of Model 1 and be assigned to the segment for Model 1. If the input value is 0.2, the input value would fall within the value range of Model 2 and be assigned to the segment for Model 2.

An adjacent segment closest to the input value is identified (912). This adjacent segment may be the closest segment to the input value and that is different than the segment to which the input value is assigned. The analysis apparatus 120 can identify the adjacent segment closest to the input value based on the magnitude of the difference between the input value and a value for each segment that is adjacent to the segment for which the input value is assigned. The value for each adjacent segment may be the value of the segment closest to the input value.

For example, with reference to FIG. 7, if the input value is 0.2, the image analysis apparatus 120 may assign the input value to the segment for Model 2 and further identify the segments for Models 1 and 3 as adjacent segments. The image analysis apparatus 120 may determine which one of the adjacent segments is closest to the input value. For example, the image analysis apparatus 120 may determine the magnitude of the difference between the input value and the value of the segment for Model 1 that is closest to the input value, e.g., |0.2−(−0.5)|=0.7). The image analysis apparatus 120 may also determine the magnitude of the difference between the input value and the value of the segment for Model 3 that is closest to the input value (e.g., |0.2−0.5|=0.3). In this example, the image analysis apparatus 120 may identify the segment for Model 3 as the adjacent segment as the difference for Model 3, e.g., 0.3, is less than the difference for Model 1, e.g., 0.7.

A first model output is determined based on the input value and the predictive model for the segment in which the input value is included (914). For example, the image analysis apparatus 120 may apply the predictive model for the segment to which the input value is assigned to the input value to determine the first model output. With reference to FIG. 7, if the input value is 0.2, the image analysis apparatus 120 may apply Model 2 to the input value to determine the first model output.

A second model output is determined based on the input value and the predictive model for the adjacent segment (916). For example, the image analysis apparatus 120 may apply the predictive model for the adjacent segment closest to the input value to the input value to determine the second model output. With reference to FIG. 7, if the input value is 0.2, the image analysis apparatus 120 may apply Model 3 to the input value to determine the second model output.

A classification output for the input value is computed based on the first model output and the second model output (918). For example, the image analysis apparatus 120 may compute the classification output by computing a sum, average, weighted sum, or weighted average of the first model output and the second model output. An example process for computing the classification output using two model outputs is illustrated in FIG. 10 and described below.

A determination is made whether classification output has been computed for each data dimension (920). For example, the image analysis apparatus 120 may determine whether a classification output has been computed for each data dimension for which one or more predictive models have been trained for the query. If a classification output has not been computed for each data dimension, another content feature value is selected as an input value (908).

If a classification output has been computed for each data dimension, a relevance score for the input image is computed based on the classification output for each data dimension (922). For example, the image analysis apparatus 120 may compute the relevance score by computing a sum, average, weighted sum, or weighted average of the classification outputs for each data dimension. This relevance score represents the overall relevance of the image to the query based on the content feature values extracted from the image and the predictive models trained for the query.

Figure 10:
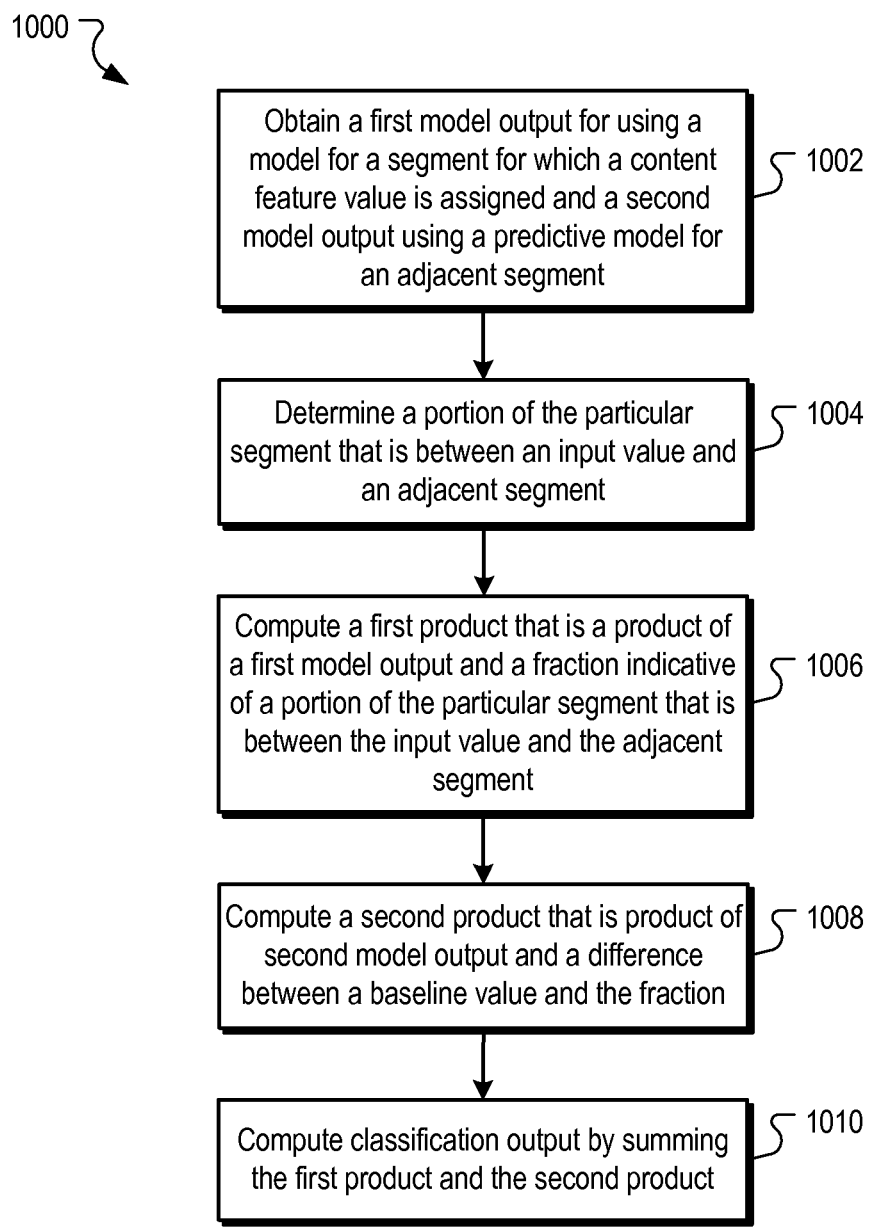
FIG. 10 is a flow chart of an example process for computing a classification output for a data dimension.

FIG. 10 is a flow chart of an example process 1000 for computing a classification output for a data dimension. For example, the image analysis apparatus 120 can determine a classification output for a data dimension using outputs of two or more predictive models for a content feature value for the data dimension. Although more than two model outputs may be used in some implementations, FIG. 10 is described in terms of outputs from two models.

A first model output and a second model output for an input value for the dimension are obtained (1002). For example, the image analysis apparatus 120 may determine the first model output by applying a first model to the input value, such as a model that corresponds to a segment of the data dimension that the input value is assigned. Similarly, the image analysis apparatus 120 may determine the second model output by applying a second model to the input value, such as a model that corresponds to an adjacent segment of the data dimension. This adjacent segment may be adjacent to the segment to which the input value is assigned and the closest adjacent segment to the input value.

A portion of the segment to which the input value is assigned that is between the input value and the adjacent segment is determined (1004). For example, the image analysis apparatus 120 may determine this portion of the segment by determining the magnitude of the difference between the input value and the value at the end of the value range for the adjacent segment that is closest to the input value. By way of example and with reference to FIG. 6, if the input value is −0.5, the segment for the input value may be segment 601. The adjacent segment may be segment 603. In this example, the portion of the segment 601 between the input value of −0.5 and the adjacent segment 603 is 0.5, e.g., 0.0−(−0.5) =0.5.

A first product of the first model output and a fraction indicative of the portion of the segment that is between the input value and the adjacent segment is computed (1006). For example, the numerator of the fraction may be the range of the segment minus the magnitude of the portion of the segment that is between the input value and the adjacent segment. The denominator of the fraction may be the range of the segment. Continuing the example above with respect to FIG. 6, the range of the segment is 1; the numerator for the fraction is 0.5, e.g., 1.0−0.5=0.5; and the denominator is 1. Thus, the fraction would be 0.5/1.0.

A second product of the second model output and a difference between a baseline value and the fraction is computed (1008). For example, the image analysis apparatus 120 may compute the difference between the baseline and the fraction and compute the product of this difference and the second model output. In some implementations, the baseline is 1.

The classification output is computed by summing the first product and the second product (1010). For example, the image analysis apparatus 120 may compute the sum of the first product and the second product. In some implementations, the classification output may be computed by determining the average of the first product and the second product. Other ways of combining the first product and the second product may also be used.

Figure 11:
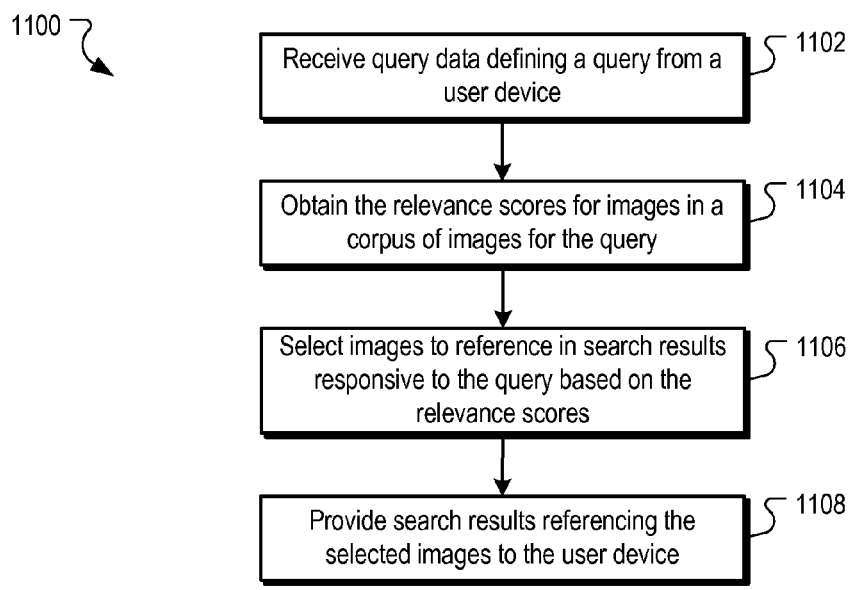
FIG. 11 is a flow chart of an example process for providing search results in response to a query.

FIG. 11 is a flow chart of an example process 1100 for providing search results in response to a query. Query data defining a query is received from a user device 106 (1102). The received query can be, for example, an image search query submitted by a user using a user device 106. The query data can be received, for example by the search system 110.

The relevance scores for images in a corpus of images for the received query are obtained (1104). In some implementations, the relevance scores are obtained to identify images that are relevant to the received query. The relevance scores are a measure of the relevance of the images to the received query. For example, an image having a relevance score that is higher than the relevance score for another image is more relevant to the received query than the other image.

The relevance scores can be accessed, for example by the search system 110. In some implementations, the relevance scores are determined by the image analysis apparatus 120 before the query is received by the search system 110 and stored in a query index of the historical data store. The image analysis apparatus 120 may determine relevance scores for images and for queries prior to query time. For example, the image analysis apparatus 120 may determine relevance scores for images and queries periodically.

In some implementations, the image analysis apparatus 120 determines relevance scores for images with respect to a received query after receiving the query. For example, the search system 110 may provide the query and/or a set of candidate images to the image analysis apparatus 120 along with a request to determine relevance scores for the candidate images with respect to the query. The image analysis apparatus 120 can apply content feature values for each of the candidate images to the predictive models for the query and determine the relevance scores for the images based on the content feature values of the images and the predictive models at query time. The image analysis apparatus 120 can transmit rank data specifying the relevance scores for the images to the search system 110.

Images are selected for reference in search results responsive to the received query based on the relevance scores (1106). In some implementations, images having a higher relevance score are selected for reference at higher or better presentation positions of the image search results than images having a lower relevance score.

The search results referencing the selected images are provided to the user device 106 that submitted the query (1108). For example, the search system 110 may order the search results based on the relevance scores for the images referenced by the search results and provide the search results to the user device 106 based on the order.

Implementations of the subject matter and the operations described in this specification can be implemented in digital electronic circuitry, or in computer software, firmware, or hardware, including the structures disclosed in this specification and their structural equivalents, or in combinations of one or more of them. Implementations of the subject matter described in this specification can be implemented as one or more computer programs, e.g., one or more modules of computer program instructions, encoded on computer storage medium for execution by, or to control the operation of, data processing apparatus. Alternatively or in addition, the program instructions can be encoded on an artificially generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially generated propagated signal. The computer storage medium can also be, or be included in, one or more separate physical components or media, e.g., multiple CDs, disks, or other storage devices.

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing The apparatus can include special purpose logic circuitry, e.g., an FPGA (field programmable gate array) or an ASIC (application specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program, also known as a program, software, software application, script, or code, can be written in any form of programming language, including compiled or interpreted languages, declarative or procedural languages, and it can be deployed in any form, including as a stand alone program or as a module, component, subroutine, object, or other unit suitable for use in a computing environment. A computer program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub programs, or portions of code. A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few. Devices suitable for storing computer program instructions and data include all forms of non volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, implementations of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Implementations of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), an inter-network, e.g., the Internet, and peer-to-peer networks, e.g., ad hoc peer-to-peer networks.

The computing system can include clients and servers. A client and server are generally remote from each other and typically interact through a communication network. The relationship of client and server arises by virtue of computer programs running on the respective computers and having a client-server relationship to each other. In some implementations, a server transmits data, e.g., an HTML page, to a client device, e.g., for purposes of displaying data to and receiving user input from a user interacting with the client device. Data generated at the client device, e.g., a result of the user interaction, can be received from the client device at the server.

While this specification contains many specific implementation details, these should not be construed as limitations on the scope of this document or of what may be claimed, but rather as descriptions of features specific to particular implementations of the subject matter. Certain features that are described in this specification in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

Thus, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A method performed by a data processing apparatus, the method comprising:
   receiving training samples for a particular data dimension, each training sample specifying a training value for the data dimension and a measure of relevance between the training sample and a phrase;
   determining a value range for the data dimension, the value range being based on the training values specified by the training samples;
   segmenting the value range into two or more segments, each segment including a proper subset of the value range;
   training a predictive model for each of the segments, the predictive model for each segment being trained to predict an output based on an input value that is within the segment, the predictive model for each segment being trained based on the training samples and the specified training values included in the segment and the measure of relevance for the training samples;
   receiving a classification sample that specifies an input value; and
   computing a classification output based on the input value, the classification output being based on both of:
      the predictive model for the segment in which the input value is included; and
      the predictive model for an adjacent segment to the segment in which the input value is included.

2. The method of claim 1, further comprising:
   grouping the training samples to standardized values, the training samples that are grouped to a particular standardized value being those training samples for which the specified training values are within a threshold value of the standardized value; and
   determining a weight for each standardized value, the weight for the standardized value being based on the training values that are assigned to the training samples that have been grouped to the standardized value.

3. The method of claim 2, wherein training a predictive model for each of the segments comprises generating a linear model for each of the segments, the linear model for each segment being generated based on the standardized values that are included in the segment and the weight for each standardized value that is included in the segment.

4. The method of claim 1, wherein computing a classification output comprises:
   assigning the input value to a particular segment, the particular segment being a segment beginning at a first value and ending at a second value, wherein the input value is between the first value and the second value;
   identifying, as the adjacent segment, a segment, other than the particular segment, including a value that is closest to the input value;
   determining a first model output based on the input value and the predictive model for the segment in which the input value is included;
   determining a second model output based on the input value and the predictive model for the adjacent segment; and
   computing the classification output based on the first model output and the second model output.

5. The method of claim 4, further comprising:
   determining a portion of the particular segment that is between the input value and the adjacent segment; and
   weighting each of the first model output and the second model output based on the portion of the particular segment that is between the input value and the adjacent segment.

6. The method of claim 5, wherein weighting each of the first model output and the second model output comprises:
   computing a first product that is a product of the first model output and a fraction indicative of the portion of the particular segment that is between the input value and the adjacent value; and
   computing a second product that is a product of the second model output and a difference between a baseline value and the fraction.

7. The method of claim 6, wherein computing the classification output comprises computing a sum of the first product and the second product.

8. A non-transitory computer storage medium encoded with a computer program, the program comprising instructions that when executed by data processing apparatus cause the data processing apparatus to perform operations comprising:
   receiving training samples for a particular data dimension, each training sample specifying a training value for the data dimension and a measure of relevance between the training sample and a phrase;
   determining a value range for the data dimension, the value range being based on the training values specified by the training samples;
   segmenting the value range into two or more segments, each segment including a proper subset of the value range;
   training a predictive model for each of the segments, the predictive model for each segment being trained to predict an output based on an input value that is within the segment, the predictive model for each segment being trained based on the training samples and the specified training values included in the segment and the measure of relevance for the training samples;
   receiving a classification sample that specifies an input value; and
   computing a classification output based on the input value, the classification output being based on both of:
      the predictive model for the segment in which the input value is included; and
      the predictive model for an adjacent segment to the segment in which the input value is included.

9. The non-transitory computer storage medium of claim 8, wherein the instructions when executed by data processing apparatus cause the data processing apparatus to perform further operations comprising:
   grouping the training samples to standardized values, the training samples that are grouped to a particular standardized value being those training samples for which the specified training values are within a threshold value of the standardized value; and
   determining a weight for each standardized value, the weight for the standardized value being based on the training values that are assigned to the training samples that have been grouped to the standardized value.

10. The non-transitory computer storage medium of claim 9, wherein training a predictive model for each of the segments comprises generating a linear model for each of the segments, the linear model for each segment being generated based on the standardized values that are included in the segment and the weight for each standardized value that is included in the segment.

11. The non-transitory computer storage medium of claim 8, wherein computing a classification output comprises:
   assigning the input value to a particular segment, the particular segment being a segment beginning at a first value and ending at a second value, wherein the input value is between the first value and the second value;
   identifying, as the adjacent segment, a segment, other than the particular segment, including a value that is closest to the input value;
   determining a first model output based on the input value and the predictive model for the segment in which the input value is included;
   determining a second model output based on the input value and the predictive model for the adjacent segment; and
   computing the classification output based on the first model output and the second model output.

12. The non-transitory computer storage medium of claim 11, wherein the instructions when executed by data processing apparatus cause the data processing apparatus to perform further operations comprising:
   determining a portion of the particular segment that is between the input value and the adjacent segment; and
   weighting each of the first model output and the second model output based on the portion of the particular segment that is between the input value and the adjacent segment.

13. The non-transitory computer storage medium of claim 12, wherein weighting each of the first model output and the second model output comprises:
   computing a first product that is a product of the first model output and a fraction indicative of the portion of the particular segment that is between the input value and the adjacent value; and
   computing a second product that is a product of the second model output and a difference between a baseline value and the fraction.

14. A system comprising:
   a data store for storing predictive models; and
   one or more processors configured to interact with the data store, the one or more processors being further configured to perform operations comprising:
      receiving training samples for a particular data dimension, each training sample specifying a training value for the data dimension and a measure of relevance between the training sample and a phrase;
      determining a value range for the data dimension, the value range being based on the training values specified by the training samples;
      segmenting the value range into two or more segments, each segment including a proper subset of the value range;
      training a predictive model for each of the segments, the predictive model for each segment being trained to predict an output based on an input value that is within the segment, the predictive model for each segment being trained based on the training samples and the specified training values included in the segment and the measure of relevance for the training samples;
      receiving a classification sample that specifies an input value; and
      computing a classification output based on the input value, the classification output being based on both of:

the predictive model for the segment in which the input value is included; and the predictive model for an adjacent segment to the segment in which the input value is included.

15. The system of claim 14, wherein the one or more processors are further configured to perform operations comprising:

grouping the training samples to standardized values, the training samples that are grouped to a particular standardized value being those training samples for which the specified training values are within a threshold value of the standardized value; and determining a weight for each standardized value, the weight for the standardized value being based on the training values that are assigned to the training samples that have been grouped to the standardized value.

16. The system of claim 15, wherein training a predictive model for each of the segments comprises generating a linear model for each of the segments, the linear model for each segment being generated based on the standardized values that are included in the segment and the weight for each standardized value that is included in the segment.

17. The system of claim 14, wherein computing a classification output comprises:

assigning the input value to a particular segment, the particular segment being a segment beginning at a first value and ending at a second value, wherein the input value is between the first value and the second value;

identifying, as the adjacent segment, a segment, other than the particular segment, including a value that is closest to the input value;

determining a first model output based on the input value and the predictive model for the segment in which the input value is included;

determining a second model output based on the input value and the predictive model for the adjacent segment; and computing the classification output based on the first model output and the second model output.

18. The system of claim 17, wherein the one or more processors are further configured to perform operations comprising:

determining a portion of the particular segment that is between the input value and the adjacent segment; and weighting each of the first model output and the second model output based on the portion of the particular segment that is between the input value and the adjacent segment.

19. The system of claim 18, wherein weighting each of the first model output and the second model output comprises:

computing a first product that is a product of the first model output and a fraction indicative of the portion of the particular segment that is between the input value and the adjacent value; and computing a second product that is a product of the second model output and a difference between a baseline value and the fraction.

20. The system of claim 19, wherein computing the classification output comprises computing a sum of the first product and the second product.

* * * * *